(12) United States Patent
Eoh et al.

(10) Patent No.: US 11,055,341 B2
(45) Date of Patent: Jul. 6, 2021

(54) CONTROLLING METHOD FOR ARTIFICIAL INTELLIGENCE MOVING ROBOT

(71) Applicant: LG ELECTRONICS INC., Seoul (KR)

(72) Inventors: Gyuho Eoh, Seoul (KR); Hoyoung Lee, Seoul (KR); Dongki Noh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/659,971

(22) Filed: Oct. 22, 2019

(65) Prior Publication Data

US 2020/0125597 A1   Apr. 23, 2020

(30) Foreign Application Priority Data

Oct. 22, 2018 (KR) .................. 10-2018-0125760

(51) Int. Cl.
| | |
|---|---|
| *G06F 16/44* | (2019.01) |
| *G06F 16/84* | (2019.01) |
| *B25J 9/00* | (2006.01) |
| *G05D 1/02* | (2020.01) |
| *G06K 9/00* | (2006.01) |

(52) U.S. Cl.
CPC .......... *G06F 16/444* (2019.01); *B25J 9/0003* (2013.01); *G05D 1/0274* (2013.01); *G06F 16/84* (2019.01); *G06K 9/00664* (2013.01)

(58) Field of Classification Search
CPC ........ G06F 16/44; G06F 16/84; B25J 9/0003; G06K 9/00664
See application file for complete search history.

(56) References Cited

U.S. PATENT DOCUMENTS

| | | | | |
|---|---|---|---|---|
| 2008/0065267 | A1* | 3/2008 | Hong ............... | B25J 9/0003 700/245 |
| 2016/0154408 | A1 | 6/2016 | Eade et al. | |
| 2018/0189565 | A1* | 7/2018 | Lukierski ......... | G06T 7/55 |
| 2018/0210445 | A1 | 7/2018 | Choi et al. | |
| 2019/0197396 | A1* | 6/2019 | Rajkumar ......... | B25J 9/0003 |

FOREIGN PATENT DOCUMENTS

| | | |
|---|---|---|
| KR | 10-0926783 | 11/2009 |
| KR | 10-2010-0104581 | 9/2010 |
| KR | 10-2018-0023302 | 3/2018 |

OTHER PUBLICATIONS

Korean Office Action dated Nov. 27, 2019.
European Search Report dated Jan. 3, 2020 issued in EP Application No. 19204638.1.

* cited by examiner

*Primary Examiner* — Nabil H Syed
(74) *Attorney, Agent, or Firm* — KED & Associates LLP

(57) ABSTRACT

A controlling method for an artificial intelligence moving robot according to an aspect of the present disclosure includes: moving based on a map including a plurality of regions; acquiring images from the plurality of regions through an image acquisition unit during the moving; extracting region feature information based on the acquired image; and storing the extracted region feature information in connection with position information when an image is acquired.

3 Claims, 10 Drawing Sheets

CONTROLLING METHOD FOR ARTIFICIAL INTELLIGENCE MOVING ROBOT

CROSS-REFERENCE TO RELATED APPLICATION

This application claims the priority benefit of Korean Patent Application No. 10-2018-0125760, filed on Oct. 22, 2018 in the Korean Intellectual Property Office, the disclosure of which is incorporated herein by reference.

BACKGROUND OF THE INVENTION

Field of the Invention

The present disclosure relates to a moving robot and a method of controlling the moving robot and, more particularly, to a technology of enabling a robot to generate or learn a map or recognize a position in the map.

Related Art

A robot has been developed for the industry and has taken charge of a portion of factory automation. Recently, as the applied field using robots increasingly expands, a medical robot, an aerospace robot, etc. are developed and a domestic robot that can be used at common hole is also manufactured. A robot that can travel by itself of these robots is called a moving robot.

A robot cleaner is representative of moving robots that are used at home. A robot cleaner is a device that cleans a predetermined region by suctioning dust or dirt around it while traveling through the region by itself.

Since a moving robot can move by itself, it can freely move. Further, the moving robot is equipped with several sensors to avoid obstacles, etc. while traveling, it can travel while avoiding obstacles.

In order that a moving robot accurately moves to a desired destination, there is a method of sensing an IR (InfraRed) signal, etc. transmitted from a destination such as a cradle. However, there is a problem that this method enables a moving robot only to move limited destinations that transmit an IR signal, etc., but the moving robot cannot move to any destinations, and when the moving robot does not sense transmitted infrared light due to reasons such as a distance or an obstacle, the moving robot may wander to find a destination.

Accordingly, in order to move any positions in a traveling section, it is required to be able to find out the current position of the moving robot on a map.

To this end, various methods of continuously finding out the current position based on traveling information at a straight forward position of a moving robot (information about a movement direction and a movement speed or comparison of floor pictures continuously taken, etc.) while the moving robot continuously moves have been studied. Further, studies about various methods of enabling a moving robot to generate and learn a map by itself are being conducted.

However, when the position of the moving robot is forcibly changed during traveling due to external factors such as when a user picks up and moves a moving robot that is traveling (kidnapping), the moving robot cannot recognize an unknown current position based on traveling information at the previous position.

In order that the moving robot recognizes a current position (localization) on a map even in a 'jumping situation' including a kidnapping situation, there is a method of using sensors such as a laser sensor and an ultrasonic sensor, but there is a limit that the cost is greatly increased and it is impossible to obtain more detailed information about the surrounding environment.

Accordingly, a prior art document (Korean Patent Application Publication No. 10-2010-0104581, published on Sep. 29, 2010) has disclosed a technology of generating a 3D map from feature points extracted from images taken within a traveling section and of finding out an unknown current position using a feature point based on an image taken by a camera at the current position.

SUMMARY OF THE INVENTION

As in the prior art document, the method of recognizing a specific point as the position of a feature point by comparing any one image of the same part in a traveling section with a recognition image has a problem that the accuracy in estimation of the current position may be changed by environmental changes such as a change of illumination due to whether a light is turned on/off or the incident angle or the amount of sunlight in the traveling section and a change of the position of objects. An object of the present disclosure is to provide a technology of recognizing a position that is strong against these environmental changes.

An object of the present disclosure is to provide a technology of efficiently and accurately recognizing a position in a traveling section by increasing the success rate in recognition of the current position of a moving robot and by estimating the current position with higher reliability.

An object of the present disclosure is to provide a moving robot that can recognize properties of a plurality of regions in a traveling section and a method of controlling the moving robot.

An object of the present disclosure is to provide a moving robot that can more accurately estimate the position of the moving robot based on the result of recognizing region properties, and a method of controlling the moving robot.

In order to achieve the objects described above or other objects, a method of controlling a moving robot according to an aspect of the present disclosure includes: moving based on a map including a plurality of regions; acquiring images from the plurality of regions through an image acquisition unit during the moving; extracting region feature information based on the acquired image; and storing the extracted region feature information in connection with position information when a corresponding image is acquired, thereby being able to generate a region-based map.

A method of controlling a moving robot according to an aspect of the present disclosure includes; moving based on a map including a plurality of regions; acquiring an image through an image acquisition unit; extracting region feature information from the acquired image; and determining a current position based on SLAM-based current position node information and the extracted region feature information, thereby being able to more accurately estimate a current position.

DESCRIPTION OF EXEMPLARY EMBODIMENTS

Figure 1:
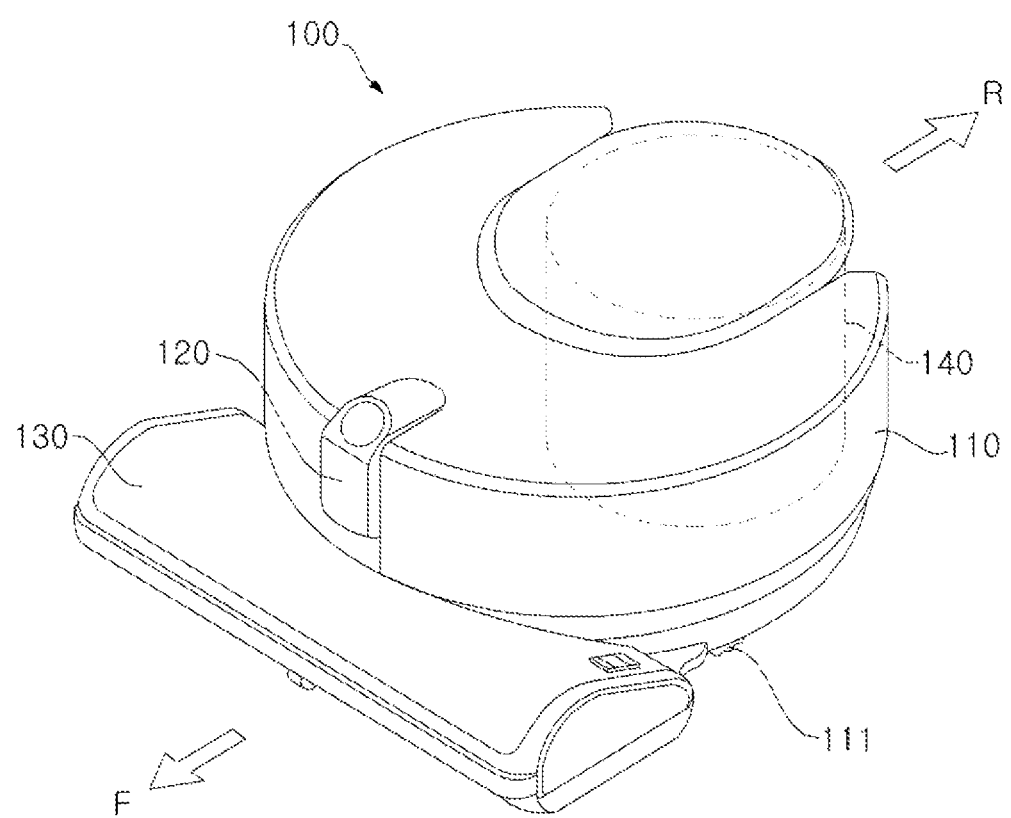
FIG. 1 is a perspective view of a moving robot according to an embodiment of the present disclosure.

Embodiments of the present disclosure are described hereafter in detail with reference to the accompanying drawings. However, it should be noted that the present disclosure is not limited to the embodiments and may be modified in various ways.

For clear and brief description of the present disclosure, parts not related to the description are not shown in the drawings and the same or similar components are indicated by the same reference numerals throughout the specification.

Terms "module" and "unit" that are used for components in the following description are used only for the convenience of description without having specifically important meanings or functions. Accordingly, the terms "module" and "unit" may be used in combination.

A moving robot 100 according to an embodiment of the present disclosure means a robot that can move by itself using wheels, etc., and may be a housemaid robot, a robot cleaner, etc. Hereafter, a robot cleaner having a cleaning function of moving robots is exemplified and described with reference to the drawings, but the present disclosure is not limited thereto.

Figure 2:
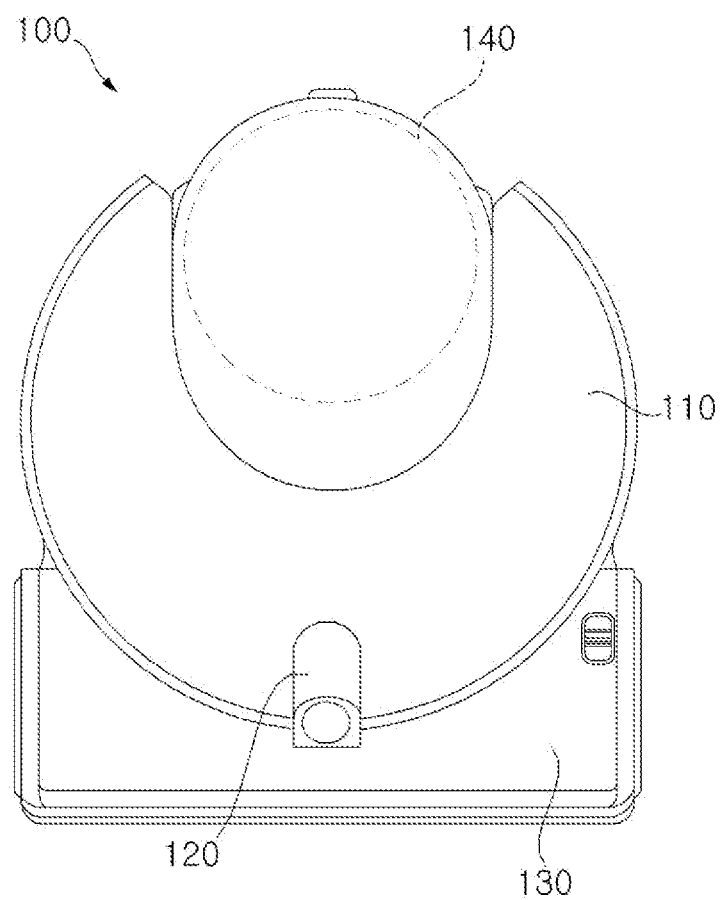
FIG. 2 is a plan view of the moving robot of FIG. 1.
Figure 3:
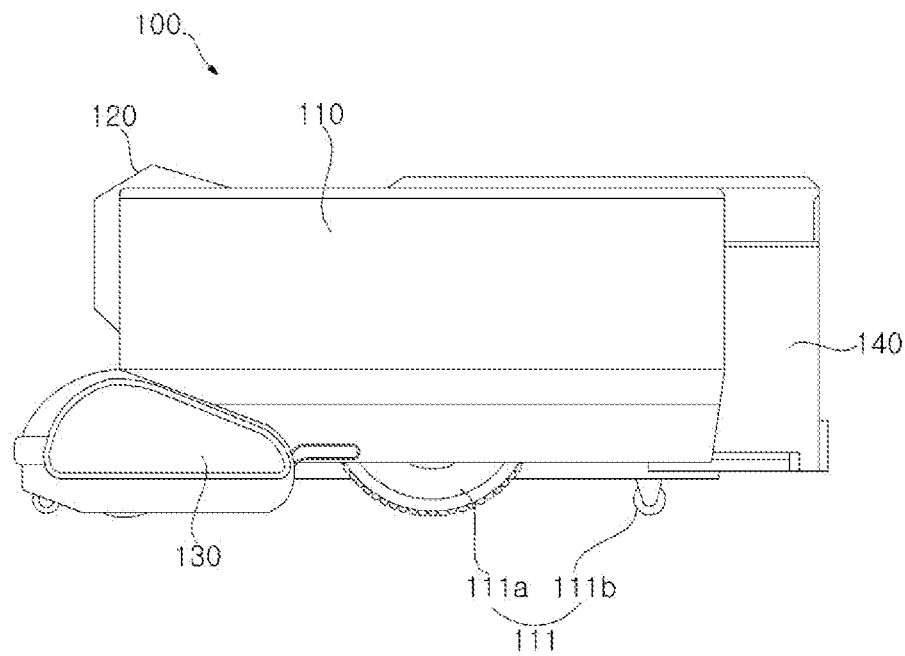
FIG. 3 is a side view of the moving robot of FIG. 1.

FIG. 1 is a perspective view of a moving robot according to an embodiment of the present disclosure, FIG. 2 is a plan view of the moving robot of FIG. 1, and FIG. 3 is a side view of the moving robot of FIG. 1.

Referring to FIGS. 1 to 3, a moving robot 100 can travel through a predetermined region by itself. The moving robot 100 can perform a function of cleaning a floor. The cleaning a floor stated herein includes suctioning dust (including dirt) on the floor or wiping the floor with a rag.

The moving robot 100 includes a main body 110. The main body 110 includes a cabinet forming the external appearance. The moving robot 100 may include a suction unit 130 and a dust container 140 that are disposed in the main body 110. The moving robot 100 includes an image acquisition unit 120 that senses information about the environment of the moving robot. The moving robot 100 includes a driving unit 160 that moves the main body. The moving robot 100 includes a controller 181 for controlling the moving robot 100. The controller is disposed in the main body 110.

The driving unit 160 includes a wheel unit 111 for driving the moving robot 100. The wheel unit 111 is disposed on the main body 110. The moving robot 100 can be moved or rotated forward, rearward, left, and right by the wheel unit 111. As the controller controls driving of the wheel unit 111, the moving robot 100 can autonomously travel on a floor. The wheel unit 111 includes main wheels 111*a* and a sub-wheel 111*b*.

The main wheels 111*a* are disposed on both sides of the main body 110 and are configured to be able to rotate in one direction or the other direction in accordance with a control signal from the controller. The main wheels 111*a* may be configured to be able to be independently driven. For example, the main wheels 111*a* may be driven by different motors, respectively.

The sub-wheel 111*b* supports the main body 110 together with the main wheels 111*a* and assists traveling of the moving robot 100 by the main wheels 111*a*. The sub-wheel 111*b* may be disposed at a suction unit 130 to be described below.

The suction unit 130 may be disposed in a shape protruding from the front F of the main body 110. The suction unit 130 is provided to suction air including dust.

The suction unit 130 may have a shape protruding to both left and the right sides from the front of the main body 110. The front end of the suction unit 130 may be disposed at a position spaced forward apart from a side of the main body 110. The both left and right sides of the suction unit 130 may be disposed respectively at positions spaced apart to both left and right sides from the main body 110.

The main body 110 is formed in a circular shape and both sides of the rear end of the suction unit 130 respectively protrudes to both left and right sides from the main body 110, so an empty space, that is, a gap can be formed between the main body 110 and the suction unit 130. The empty space is a space between the both left and right ends of the main body 110 and the both left and right ends of the suction unit 130 and has a shape recessed inside the moving robot 100.

The suction unit 130 may be detachably coupled to the main body 110. When the suction unit 130 is separated from the main body 110, a rag module (not shown) may be detachably coupled to the main body 110 instead of the separated suction unit 130.

The image acquisition unit 120 may be disposed on the main body 110. The image acquisition unit 120 may be disposed on the front F of the main body 110. The image acquisition unit 120 may be disposed to overlap the suction unit 130 in the up-down direction of the main body 110. The image acquisition unit 120 may be disposed over the suction unit 130.

The image acquisition unit 120 can sense obstacles around the moving robot 100. The image acquisition unit 120 can sense forward obstacles or configuration of the floor and objects so that the suction unit 130 positioned at the front of the moving robot 100 does not hit obstacles. The image acquisition unit 120 may additionally perform other sensing functions to be described below other than the sensing function described above.

The main body 110 may have a dust container accommodation portion (not shown). The dust container 140 that separates and collects dust in the suctioned air is detachably coupled to the dust container accommodation portion. The dust container accommodation portion may be formed on the rear R of the main body 110. A portion of the dust container 140 is accommodated in the dust container accommodation portion and the other portion of the dust container 140 may be formed to protrude toward the rear R of the main body 110.

An inlet (not shown) through which air including dust flows inside and an outlet (not shown) through which air with dust separated is discharged are formed at the dust container 140. When the dust container 140 is mounted in the dust container accommodation portion, the inlet and the outlet of the dust container 140 are configured to respectively communicate with a first opening (not shown) and a second opening (not shown) formed on the inner wall of the dust container accommodation portion.

A suction channel (not shown) that guides air from a suction port of the suction unit 130 to the first opening is provided. An exhaust channel (not shown) that guides air from the second opening to an exhaust port (not shown) open toward the outside is provided.

The air including dust and suctioned through the suction unit 130 flows into the dust container 140 through the intake channel in the main body 110, and the air and the dust are separated through a filter or a cyclone of the dust container 140. The dust is collected in the dust container 140 and the air is discharged from the dust container 140, sent through the exhaust channel in the main body 110, and then finally discharged outside through the exhaust port.

Figure 4:
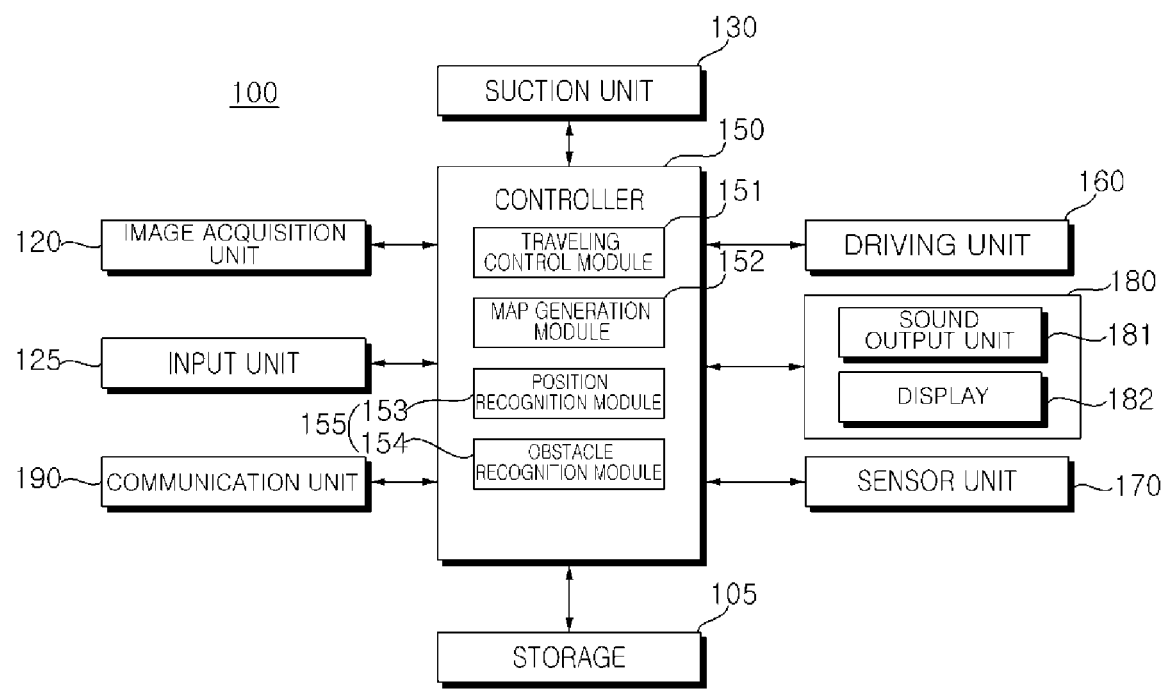
FIG. 4 is a block diagram showing a control relationship among main components of a moving robot according to an embodiment of the present disclosure.

FIG. 4 is a block diagram showing a control relationship among main components of a moving robot according to an embodiment of the present disclosure.

Referring to FIGS. 1 to 4, the moving robot 100 includes the main body 110 and the image acquisition unit 120 that acquires image around the main body 110.

The moving robot 100 includes a driving unit 160 that moves the main body 110. The driving unit 160 includes at least one wheel unit 111 that moves the main body 110. The driving unit 160 includes a driving motor (not shown) that is connected to the wheel unit 111 and rotates the wheel unit 111.

The image acquisition unit 120 that photographs a traveling section may include a camera module. The camera module may include a digital camera. The digital camera may include at least one optical lens, an image sensor (e.g., a CMOS image sensor) including several photodiodes (e.g., pixels) in which images are formed by light that has passed through the optical lens, and a digital signal processor (DSP) that forms an image based on signals output from the photodiodes. The digital signal processor can generate not only still images, but also moving images composed of frames composed of still images.

Such a camera may be installed as several pieces at predetermined respective positions for photographing efficiency. An image taken by the camera can be used to recognize the kinds of matters such as dust, hairs, and a floor that exist in a corresponding space and to check whether cleaning has been performed, or a point in time of cleaning.

The camera can photograph the situation of obstacles or a cleaning region that exists in the front area in the traveling direction of the moving robot 100.

According to an embodiment of the present disclosure, the image acquisition unit 120 can acquire a plurality of images by continuously photographing the surrounding of the main body 110 and the plurality of acquired images can be stored in a storage 105.

The moving robot 100 can increase accuracy in space recognition, position recognition, and obstacle recognition using a plurality of images or can increase accuracy in space recognition, position recognition, and obstacle recognition by using effective data by selecting one or more images from the plurality of images.

Further, the moving robot 100 may include a sensor unit 170 including sensors that sense various data related to the motion and the state of the moving robot.

For example, the sensor unit 170 may include an obstacle sensor that senses obstacles in the front area. Further, the sensor unit 170 may further include a steep portion sensor that senses whether there is a steep portion on the floor in a traveling section, and a bottom camera sensor that acquires images of a floor.

The obstacle sensor may include an infrared sensor, an ultrasonic sensor, and RF sensor, a geomagnetic sensor, a PSD (Position Sensitive Device) sensor, etc.

Meanwhile, the positions and kinds of the sensors included in the obstacle sensor may depend on the kind of the moving robot and the obstacle sensor may further include more various sensors.

Meanwhile, the sensor unit 170 may further include a motion sensor that senses motions of the moving robot 100 according to driving of the main body 110 and outputs motion information. For example, a gyro sensor, a wheel sensor, an acceleration sensor, etc. may be used as the motion sensor.

The gyro sensor senses a rotational direction and a rotational angle when the moving robot 100 is moved in accordance with a driving mode. The gyro sensor detects an angular speed of the moving robot 100 and outputs a voltage value that is proportioned to the angular speed. The controller 150 calculates a rotational direction and a rotational angle using the voltage value that is output from the gyro sensor.

The wheel sensor is connected to the wheel unit 100 and senses the number of revolutions of the wheels. In this configuration, the wheel sensor may be a rotary encoder.

The acceleration sensor senses a speed change of the moving robot 100, for example, changes of the moving robot 100 according to a start, a stop, a direction change, and a collision with an object.

Further, the acceleration sensor may be disposed in the controller 150 and can sense a speed change of the moving robot 100.

The controller 150 can calculate a position change of the moving robot 100 based on motion information output from the motion sensor. The position is a relative position to an absolute position using image information. The moving robot can improve position recognition performance using image information and obstacle information through such relative position recognition.

Meanwhile, the robot 100 may include a power supplier (not shown) that has a chargeable battery and supplies power into the moving robot.

The power suppliers can supply driving power and operation power to each component of the moving robot 100, and when the remaining power is insufficient, the power supplier can be charged with power that is supplied from a cradle (not shown).

The moving robot 100 may further include a battery sensing unit (not shown) that senses the charge state of the battery and transmits the sensing result to the controller 150. The battery is connected with the battery sensing unit, so the remains and the charge state of the battery are transmitted to the controller 150. The remains of the battery can be shown on a display 182 of an output unit 180.

Further, the moving robot 100 includes an input unit 125 through which turning-on/off or various instructions can be input. The input unit 125 may include a button, a dial, a touch screen or the like. The input unit 125 may include a microphone for receiving voice instructions input from a user. It is possible to receive various control instructions for the general operation of the moving robot 100 through the input unit 125.

Further, the moving robot 100 includes the output unit 180, so it is possible to display reservation information, a battery state, an operation mode, an operation state, an error state, etc. using images or output them using sounds.

The output unit 180 may include a sound output unit 181 that outputs audio signals. The sound output unit 181 can output notification messages such as an alarm, an operation mode, an operation state, and an error state using sounds. The sound output unit 181 can convert and output an electrical signal from the controller 150 into an audio signal. To this end, a speaker, etc. may be provided.

Further, the output unit 180 may further include the display 182 that displays reservation information, a charge state, an operation mode, an operation state, an error state, etc. using images.

Referring to FIG. 4, the moving robot 100 includes the controller 150 that processes and determines various items of information including recognition of a current position, and the storage 105 that stores various data. Further, the moving robot 100 may further include a communication unit 190 that transmits/receives data to/from an external terminal.

The external terminal has applications for controlling the moving robot 100, and can display a map about a traveling section to be cleaned by the moving robot 100 and designate regions such that a specific region on the map is cleaned by executing the applications. The external terminal, for example, may be a remote controller, a PDA, a laptop, a smartphone, a tablet, etc. including applications for setting a map.

The external terminal can display the current position of the moving robot together with a map and display information about a plurality of regions by communicating with the moving robot 100. Further, the external terminal updates and displays the position in accordance with traveling of the moving robot.

The controller 150 controls the general operation of the moving robot 100 by controlling the image acquisition unit 120, the input unit 125, the driving unit 160, the suction unit 130, etc. constituting the moving robot 100.

The controller 150 can process a voice input signal of a user received through the microphone of the input unit 125 and perform a voice recognition process. Depending on embodiments, the moving robot 100 may include a voice recognition module that performs voice recognition inside or outside the controller 150.

Depending on embodiments, the moving robot 100 may perform simple voice recognition by itself, and high-order voice recognition such as processing of natural languages may be performed in a server 70.

The storage 105, which records various items of information for controlling the moving robot 100, may include a volatile or nonvolatile recording medium. The recording medium, which stores data that can be read by a microprocessor, may include an HDD (Hard Disk Drive), an SSD (Solid State Disk), an SDD (Silicon Disk Drive), a ROM, a RAM, a CD-ROM, a magnetic tape, a floppy disk, an optical data storage, etc.

Further, a map about a traveling section may be stored in the storage 105. The map may be input by an external terminal, a server, etc. that can exchange information with the moving robot 110 through wire or wireless communication or may be generated by the moving robot 100 itself through learning.

The positions of rooms in a traveling section may be shown on the map. Further, the current position of the moving robot 100 can be shown on the map and the current position of the moving robot 100 on the map can be updated during traveling. The external terminal stores a map that is the same as the map stored in the storage 105.

The storage 105 can store cleaning history information. The cleaning history information may be generated ever time cleaning is performed.

The map about a traveling section stored in the storage 105, which is a datum storing predetermined information of a traveling section in a predetermined format, may be a navigation map that is used for traveling during cleaning, a SLAM (Simultaneous localization and mapping) map that is used for position recognition, a learning map that stores corresponding information when the moving robot hits an obstacle, etc., and that is used for learning cleaning, a turning position map that is used for turning position recognition, an obstacle recognition map in which information about recognized obstacles is stored, etc.

The map may mean a node map including a plurality of nodes. In this case, the node means data showing any one position on the map that corresponds to a point that is any one position in a traveling section.

The node map may include node information that is various data corresponding to respective nodes. For example, the node information may include a position information, image information acquired at positions corresponding to nodes, etc. The position information (X, Y, θ) may include an X-coordinate (X) of the robot, a Y-coordinate (Y) of the robot, and direction information (θ) at a corresponding node. The direction information (θ) may be referred to as angle information, etc.

On the other hand, it is possible to separately store and manage maps in the storage 105 for respective uses, but maps may not be clearly discriminated for respective uses. For example, a plurality of items of information may be stored on one map to be able to be used for at least two or more uses.

The controller 150 may include a traveling control module 151, a map generation module 152, a position recognition module 153, and an obstacle recognition module 154.

Referring to FIGS. 1 to 4, the traveling control module 151, which controls traveling of the moving robot 100, controls driving of the driving unit 160 in accordance with traveling setting. Further, the traveling control module 151 can find out the traveling path of the moving robot 100 based on the operation of the driving unit 160. For example, the traveling control module 151 can find out the current or past movement speed, the traveling distance, etc. of the moving robot 100 based on the rotational speed of the wheel unit 111, and the position of the moving robot 100 on the map can be updated based on the traveling information of the moving robot 100 found out as described above.

The map generation module 152 can generate a map of a traveling section. The map generation module 152 can make a map by processing images acquired through the image acquisition unit 120. That is, it is possible to make a cleaning map corresponding to a cleaning region.

Further, the map generation module 152 can recognize turning positions by processing images acquired through the image acquisition unit 120 and liking the images with a map.

The position recognition module 153 estimates and recognizes a current position. The position recognition module 153 can estimate and recognize a current position even if the position of the moving robot 100 is suddenly changed, by finding out a position in cooperation with the map generation module 152 using the image information of the image acquisition unit 120.

Further, the position recognition module 153 can recognize the property of a currently positioned region, that is, the position recognition module 153 can recognize a space.

The moving robot 100 can recognize a position while continuously traveling through the position recognition module 153, and can learn a map and estimate a current position, etc. through the map generation module 152 and the obstacle recognition module 154 without the position recognition module 153.

While the moving robot 100 travels, the image acquisition unit 120 acquires images around the moving robot 100. Hereafter, an image acquired by the image acquisition unit 120 is referred to as an 'acquired image'.

Various features such as lights on the ceiling, edges, corners, blobs, and ridges are included in the acquired image.

The map generation module 152 extracts features from acquired images and calculates a descriptor based on feature points. The descriptor means data in a predetermined format for showing feature points and means mathematical data in a format from which the distance or similarity between descriptors can be calculated. For example, the descriptor may be n-order vector (n is a natural number) or matrix type data.

The map generation module 152 can classify at least one descriptor into a plurality of groups for each acquired image in accordance with a predetermined lower-rank classification rule and can convert the descriptors included in the same group into lower-rank representative descriptors, respectively, in accordance with a predetermined low-rank representation rule, based on descriptor information obtained through acquired images of respective positions.

As another example, it may be possible to classify all descriptors collected from acquired images in a predetermined region such as a room into a plurality of groups in accordance with a predetermined lower-rank classification rule and to convert the descriptors included in the same group into lower-rank representative descriptors, respectively, in accordance with the predetermined low-rank representation rule.

The map generation module 152 can obtain feature distribution of each position through this process. The feature distribution of each position may be expressed as a histogram or an n-order vector. As another example, the map generation module 152 can estimate an unknown current position based on descriptors calculated from respective feature points without through the predetermined lower-rank classification rule and the predetermined lower-rank representation rule.

Further, when the current position of the moving robot 100 is in an unknown state due to a reason such as a position jump, it is possible to estimate the current position based on data such as pre-stored descriptors or lower-rank representative descriptors.

The moving robot 100 acquires an acquired image through the image acquisition unit 120 at an unknown current position. Various features such as lights on the ceiling, edges, corners, blobs, and ridges are found out through images.

The position recognition module 153 extracts features from an acquired image and calculate a descriptor.

The position recognition module 153 converts it into comparison target position information (e.g., feature distribution of each position) and comparable information (lower-rank recognition feature distribution) in accordance with a predetermined lower-rank conversion rule based on at least one descriptor obtained through an acquired image of an unknown current position.

In accordance with the predetermined lower-rank conversion rule, it is possible to calculate each similarity by comparing each position feature distribution with each recognition feature distribution. It is possible to calculate similarity (probability) for each of the positions corresponding to each position and to determine the position where the largest probability is calculated as a current position.

As described above, the controller 150 can divide a traveling section, and can generate a map composed of a plurality of regions or recognize the current position of the main body 110 based on a pre-stored map.

When a map is generated, the controller 150 can transmit the generated map to an external terminal, a server, etc. through the communication unit 190. Further, when a map is received from an external terminal, a server, etc., as described above, the controller 150 can store the map in the storage 105.

In this case, the map may having a cleaning region divided into a plurality of regions, include connection passages connecting the plurality of regions, and include information about obstacles in the regions.

When a cleaning instruction is input, the controller 150 determines whether a position on the map and the current position of the moving robot coincide. The cleaning instruction can be input from a remote controller, an input unit, or an external terminal.

When the current position does not coincide with a position on the map or when it is impossible to find out the current position, the controller 150 can recover the current position of the moving robot 100 by recognizing the current position and control the driving unit 160 to move to a designated region based on the current position.

When the current position does not coincide with a position on the map or when it is impossible to find out the current position, the position recognition module 153 can estimate the current position based on the map by analyzing acquired images input from the image acquisition unit 120. Further, the obstacle recognition module 154 or the map generation module 152 can also recognize the current position in the same way.

After the current position of the moving robot 100 is recovered by recognizing a position, the traveling control module 151 calculates a traveling path from the current position to the designated region and controls the driving unit 160 to move to the designated region.

When receiving cleaning pattern information from a server, the traveling control module 151 can divide the entire traveling section into a plurality of regions in accordance with the received cleaning pattern information and can set one or more regions as designated regions.

Further, the traveling control module 151 can calculate traveling paths in accordance with the received cleaning pattern information and the moving robot can perform cleaning while moving along the traveling paths.

When the designated region finishes being cleaned, the controller 150 can store a cleaning history in the storage 105.

Further, the controller 150 can transmit the operation state of the moving robot 100 or the cleaning state to an external terminal or a server at a predetermined period through the communication unit 190.

Accordingly, the external terminal displays the position of the moving robot together with a map in an image of an application that is being executed and outputs information about the cleaning state based on the received data.

The moving robot 100 according to an embodiment of the present disclosure can move in one direction until an obstacle or a wall is sensed, and when the obstacle recognition module 154 senses an obstacle, the moving robot 100 can determine traveling patterns such as straight forward movement and turning.

Meanwhile, the controller 150 can control the moving robot to perform an avoidance traveling in different patterns based on the properties of recognized obstacles. The controller 150 can control the moving robot to perform avoidance traveling in different patterns in accordance with the properties of obstacles such as a non-dangerous obstacle (a common obstacle), a dangerous obstacle, and a movable obstacle.

For example, the controller 150 can control the moving robot to avoid a dangerous obstacle by detouring the dangerous obstacle while securing a longer safety distance.

Further, when there is a movable obstacle and the movable obstacle does not move after a predetermined standby time, the controller 150 can control the moving robot to perform avoidance traveling that corresponds to a normal obstacle or avoidance traveling that corresponds to a dangerous obstacle. Alternatively, when an avoidance traveling pattern corresponding to a movable obstacle is separately set, the controller 150 can control the moving robot in accordance with the pattern.

The moving robot 100 according to an embodiment of the present disclosure can perform obstacle recognition and avoidance based on machine learning.

The controller 150 may include the obstacle recognition module 154 that recognizes pre-learned obstacles through machine learning from an input image, and the traveling control module 151 that controls driving of the driving unit 160 based on the recognized obstacles.

On the other hand, an example in which a plurality of modules 151, 152, 153, and 154 are separately provided in the controller 150 is shown in FIG. 4, but the present disclosure is not limited thereto.

For example, the position recognition module 153 and the obstacle recognition module 154 may be integrated into one recognizer, whereby they may be configured as one recognition module 155. In this case, it is possible to train the recognizer using a learning technique such as machine learning, and the trained recognizer can recognize the properties of regions, things, etc. by classifying data that are input later.

Depending on embodiments, the map generation module 152, the position recognition module 153, and the obstacle recognition module 154 may be configured in one integrated module.

Hereafter, an embodiment in which the position recognition module 153 and the obstacle recognition module 154 are configured as one recognition module 155 by being integrated into one recognizer is mainly described, but even if the position recognition module 153 and the obstacle recognition module 154 are separately provided, they can be operated in the same way.

The moving robot 150 according to an embodiment of the present disclosure may include a recognition module 155 that has learned the properties of things and spaces through machine learning.

Machine learning means making a computer perform learning through data and solve problems by itself even if a person does directly give a logic to the computer.

Deep learning is an artificial intelligence technology that enables a computer to perform learning by itself like human even if a person does not teach the computer in the way of teaching human based on an artificial neural network (ANN) for configuring artificial intelligence.

The artificial neural network (ANN) may be implemented in a software type or a hardware type such as a chip.

The recognition module 155 may include an artificial neural network (ANN) of a software or hardware type trained with the properties of spaces and the properties of things such as obstacles.

For example, the recognition module 155 may include a DNN (Deep Neural Network) such as a CNN (Convolutional Neural Network), an RNN (Recurrent Neural Network), a DBN (Deep Belief Network) trained through deep learning.

The recognition module 155 can determine the properties of spaces and things included in input image data based on weights between nodes included in the DNN.

On the other hand, the traveling control module 151 can control driving of the driving unit 160 based on the properties of the recognized spaces and obstacles.

Meanwhile, the recognition module 155 can recognize the properties of spaces and obstacles included in selected specific time point image based on data learned in advance through machine learning.

Meanwhile, input data for determining the properties of spaces and things and data for training the DNN may be stored in the storage 105.

Original images acquired by the image acquisition unit 120 and extracted images with predetermined regions extracted may be stored in the storage 105.

Further, depending on embodiments, weights and biases constituting the DNN structure may be stored in the storage 105.

Alternatively, depending on embodiments, the weights and biases constituting the DNN structure may be stored in an embedded memory of the recognition module 155.

Meanwhile, the recognition module 155 may perform a learning process using predetermined images as training data every time the image acquisition unit 120 acquires an image or extracts a portion of an image, or may perform a learning process after a predetermined number of or more images are acquired.

Alternatively, the moving robot 100 can receive data related to machine learning from the predetermined server through the communication unit 190.

In this case, the moving robot 100 can update the recognition module 155 based on the data related to machine learning and received from the predetermined server.

Figure 5:
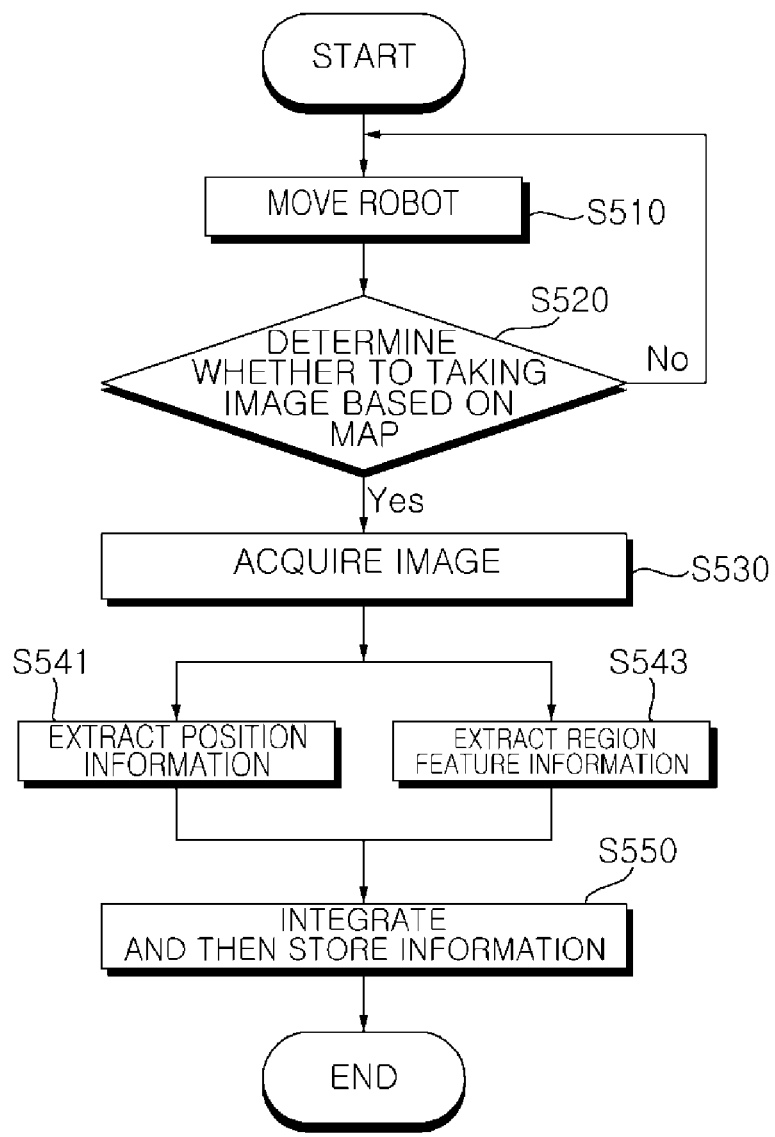
FIG. 5 is a flowchart showing a method of controlling a moving robot according to an embodiment of the present disclosure.

FIG. 5 is a flowchart showing a method of controlling a moving robot according to an embodiment of the present disclosure, which shows an example of a learning-based region feature information extraction scenario.

Referring to FIG. 5, the moving robot 100 can move in accordance with instructions or setting (S510). For example, the moving robot 100 can move based on a navigation map and/or a SLAM map. When there is no stored map, the moving robot 100 can generate a map while traveling through a traveling section through wall following, etc.

Meanwhile, the map may include a plurality of local maps. The map may be divided into a plurality of regions and each region may include one or more local map. The local maps are set not to overlap each other.

The local maps may be set in a predetermined size as a kind of unit map. For example, the local map may be set in a square shape having a size of N by N or may be set in other shapes.

The controller 150 can determine whether to photograph in accordance with predetermined map-based references (S520). For example, the controller 150 can control the image acquisition unit 120 not to additionally photograph in a region corresponding to a local map in which N images taken in different directions are acquired. When the number of data required for property recognition is secured, it is possible to prevent unnecessary calculation, processing, and recognition process by no more acquiring an image.

Further, the predetermined references may include a condition of whether the sensor unit 170 has sensed an obstacle. The predetermined references may further include whether the moving robot 100 is in a predetermined region and whether the posture (direction) of the moving robot faces the center of a predetermined region.

That is, the controller 150 can prevent data that may deteriorate accuracy in property recognition from being used by controlling the image acquisition unit 120 not to photograph in accordance with predetermined references.

The moving robot 100 can acquire a plurality of images in regions corresponding to the plurality of local maps through the image acquisition unit 120 while moving (S530).

The controller 150 can recognize a position at a predetermined node where an image is acquired (S541) and can recognize a region (S543).

The controller 150 can extract region feature information based on the acquired image (S543). Further, the controller 150 can extract position information when an image corresponding to the extracted region feature information is acquired (S541).

In this case, the position information may include a node information where an image corresponding to the extracted region feature information is acquired, and relative position information of the node and the robot. For example, the position information may include an X-coordinate of the robot, a Y-coordinate of the robot, and direction information at a corresponding node.

The position information may include node coordinate information of a node corresponding to the extracted region feature information. The node coordinate information may be generated based on an origin node and a traveling constraint. The node coordinate information may also be generated based on warning information and a distance value from a traveling obstruction factor.

The controller 150 can determine the properties of corresponding regions by classifying images acquired at the plurality of images based on data learned in advance through deep learning.

The controller 150 can perform property recognition and output the result by extracting region feature information based on deep learning, using all of or some of N images taken in different directions as input data.

The map generation module 152 and/or the recognition module 155 can recognize the property of a predetermined region and/or thing based on data learned in advance through deep learning in at least some of input images.

Meanwhile, the extracted region feature information may include a set of probability values of a region and an object that are recognized based on the acquired image. Meanwhile, the controller 150 can generate a final recognition result of a corresponding region by integrating the recognition result of a region corresponding to a predetermined local map and an object recognition result.

Figure 6:
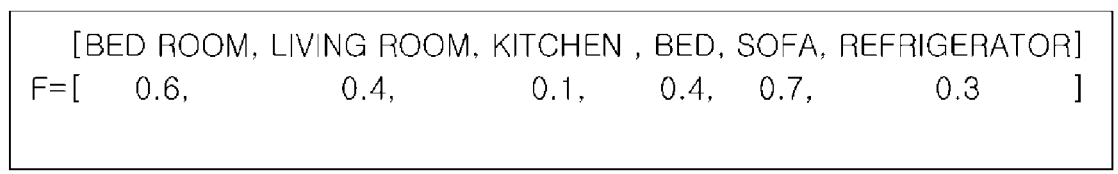
FIG. 6 is a view that is referred to for description about region recognition according to an embodiment of the present disclosure.

FIG. 6 is a view that is referred to for description about region recognition according to an embodiment of the present disclosure, which shows an example of region feature information.

Referring to FIG. 6, region feature information that is extracted and stored when a map is generated may include probability values of a region and an object that are recognized at a corresponding node.

The region feature information may include probability values of regions such as a bed room, a living room, and a kitchen and probability values of a bed, a sofa, and a refrigerator. By using the region feature information including a region recognition result and an object recognition result, as described above, it is possible to more accurately determine the properties of regions.

In this case, the probability value may be any one of values within the range of 0 (0%) to 1 (100%), and the probability increases as it goes close to 1.

Meanwhile, the controller 150 may integrate and store the extracted region feature information with position information when an image corresponding to the extracted region feature information is acquired (S550).

In this case, the controller 150 can store the extracted region feature information as node information in connection with position information when the image is acquired.

In this case, the node information may include identification information, node coordinate information, and region feature information of the corresponding node.

Further, the node information may further include feature information of the corresponding node. In this case, the feature information may be each position feature distribution that is expressed as a histogram or an n-order vector. Further, the feature information may be a descriptor calculated from each extracted feature point.

Depending on cases, the node information may further include image information corresponding to the corresponding node and distance information from the corresponding node to a surrounding environment.

The controller 150 may register and store the extracted region feature information on a predetermined map in connection with position information when an image corresponding to the extracted region feature information is acquired (S550).

More preferably, the controller 150 can register the extracted region feature information and node information when the image is acquired on a SLAM map. Further, the controller 150 can generate a navigation map based on a SLAM map.

Figure 7:
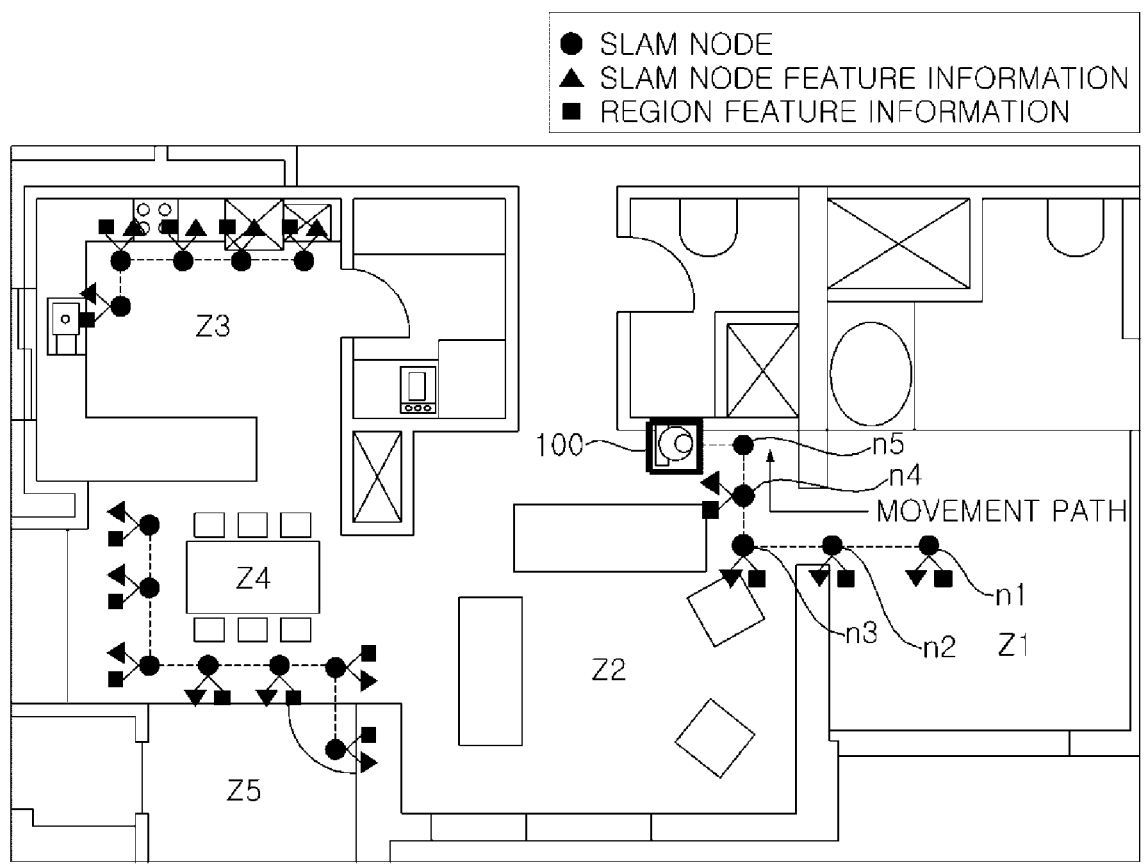
FIG. 7 is a view that is referred to for description about map generation according to an embodiment of the present disclosure.

FIG. 7 is a view that is referred to for description about map generation according to an embodiment of the present disclosure, which exemplifies a SLAM map.

Referring to FIG. 7, the moving robot 700 can acquire an image through the image acquisition unit 120 and perform map generation based on an image while moving in a traveling section including a plurality of regions Z1, Z2, Z3, Z4, and Z5.

When the moving robot 100 moves along a movement path, the controller 150 can sequentially generate a first node n1, a second node n2, a third node n3, a fourth node n4, and a fifth node n5 along the movement path and can store node information.

Further, the controller 150 can store feature information and region feature information extracted at the first node n1 to the fifth node n5 in node information. For example, the controller 150 can extract and recognize region feature information extracted at each node and can store the region feature information in connection with corresponding node coordinates.

The controller 150 can control node information, region feature information, and relative positions of a node and the robot when generating a map.

In this case, the region feature information may include a set of probability values of the recognition result of a region and an object, as described with reference to FIG. 6. Further, the set of probability values may be expressed as a vector.

For example, the region feature information of the first node may be F1 (0.9 for a bed room, 0.8 for a bed, . . . ), the region feature information of the second node may be F2 (0.6 for a bed room, 0.8 for a door, . . . ), and the region feature information of the third node n3 may be F3 (0.8 for a living room, 0.8 for a sofa, . . . ).

The moving robot 100 can extract and register or update region feature information of a plurality of regions Z1, Z2, Z3, Z4, and Z5 when generating or updating a SLAM map while moving in a traveling section including the plurality of regions Z1, Z2, Z3, Z4, and Z5.

Thereafter, the controller 150 can not only perform position recognition using feature information extracted at each node, as in the related art, but also perform position recognition even using region feature information extracted at each node.

Further, the controller 150 can further increase accuracy in position recognition by performing position recognition using all the feature information and the region feature information.

Meanwhile, the controller 150 can perform the movement step S510 to the process of integrally storing information S550 for each position while traveling one time through the entire traveling section.

Further, the controller 150 can repeatedly perform the movement step S510 to the process of integrally storing information S550.

For example, it is possible to improve accuracy of a map by repeatedly performing the movement step S510 to the process of integrally storing information S550 while traveling second based on a map including region feature information through one-time traveling. Further, it is possible to improve accuracy of a map by repeatedly performing the movement step S510 to the process of integrally storing information S550 while traveling second based on a map updated through the second traveling.

In the related art, a method of recognizing a position as a specific position of a specific point was usually used. In this case, there is a problem that the accuracy in estimation of a current position may be changed by whether a light is turned on/off or a change of the incident angle or the amount of sunlight in a traveling section when comparing any one image obtained by photographing the same part in the same traveling section with a recognition image.

That is, surrounding feature points may be differently recognized at the same position due to influence by time such as day and night and a light environment, so the position estimation accuracy may decrease.

The present disclosure can recognize the properties of a plurality region in a traveling section and can more accurately estimate the position of the moving robot based on the region property recognition result.

The present disclosure can further increase the success rate in current position recognition of the moving robot and can estimate the current position with high reliability by using the region feature information recognized and extracted from a predetermined node for position recognition.

For example, the controller 150 can improve accuracy in position estimation and performance of cleaning traveling by performing position estimation of the robot using main information (ex, a desk, a dining table, a sink) in a region that is less influenced by light/illumination.

Figure 8:
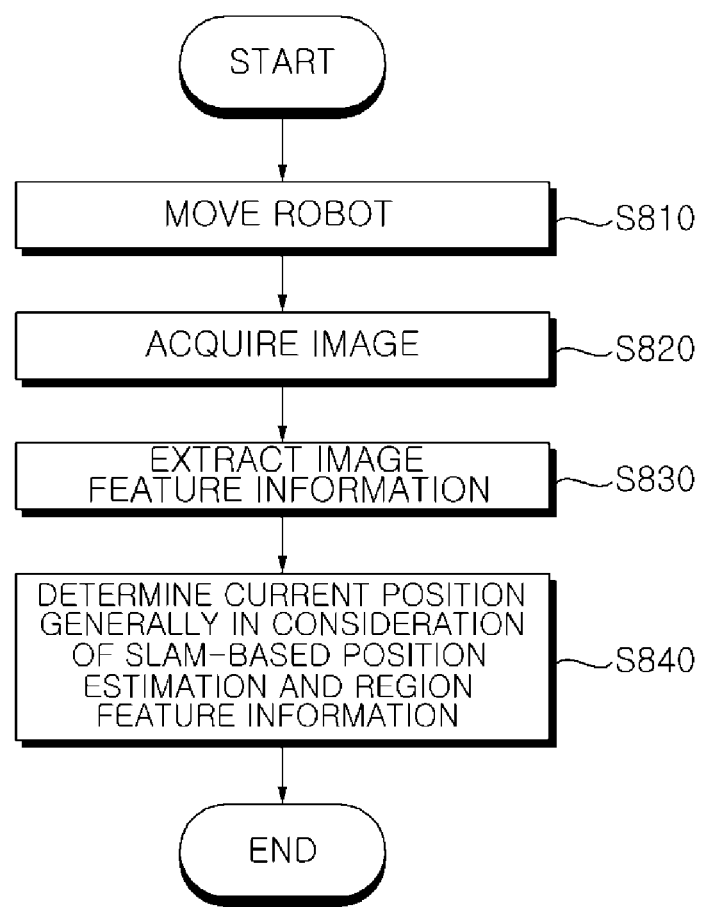
FIG. 8 is a flowchart showing a method of controlling a moving robot according to an embodiment of the present disclosure.

FIG. 8 is a flowchart showing a method of controlling a moving robot according to an embodiment of the present disclosure.

Referring to FIG. 8, the moving robot 100 can move in accordance with instructions or setting. For example, the moving robot 100 can move based on a navigation map and/or a SLAM map.

The moving robot 100 can acquire image through the image acquisition unit 120 while moving or after moving a predetermined distance (S820) and can extract region feature information from the acquired image (S830).

The controller 150 can extract region feature information based on the acquired image. In this case, the region feature information may include a set of probability values of a region and an object recognized based on the acquired image, as described with reference to FIG. 6.

Meanwhile, the controller 150 can determine the current position based on the SLAM-based current position node information and the extracted region feature information (S840).

The SLAM-based current position node information may correspond to a node that is the most similar to feature information extracted from the acquired image of pre-stored node feature information. That is, the controller 150 can select current position node information by performing position recognition using feature information extracted from each node, as in the related art.

According to the present disclosure, in order to further improve accuracy in position recognition, the controller 150 can increase accuracy in position recognition by performing position recognition using all the feature information and the region feature information.

For example, the controller 150 can select a plurality of candidate SLAM nodes by comparing the extracted region feature information with pre-stored region feature information, and can determine the current position based on candidate SLAM node information that is the most similar to the SLAM-based current position node information of the plurality of selected candidate slam nodes.

Alternatively, the controller 150 can determine the SLAM-based current position node information and can determine the final current position by correcting the determined current position node information in accordance with the extracted region feature information.

In this case, the controller 150 can determine the node that is the most similar to the extracted region feature information of the pre-stored region feature information of nodes existing in a predetermined region as the final current position based on the SLAM-based current position node information.

As a conventional position estimation method using images, local feature points such as a corner was used in a position estimation method. As described above, the method of extracting and using a feature point of an object in position estimation is not strong against environmental changes such as changes in light/illumination.

For example, it is difficult to extract a feature point at the same point when an environment such as light/illumination changes, so it is difficult to use the feature point in position estimation. In more detail, an environment is stored using only specific points in an image, in which the points are very sensitive to a change in light/illumination. Accordingly, the points are not detected even though there is a small change, or even if the points are detected, there is a limit that the points are difficult to match to existing points.

The method proposed in the present disclosure can extract features that are strong against a change of an environment such as light/illumination by using global features that describe the entire shape of an object rather than local features in order to estimate a position. Further, the present disclosure can improve position estimation performance by using extracted region feature information in position estimation.

For example, the controller 150 can extract and store region feature information (ex, a living room: a sofa, a table, a TV/a kitchen: a dining table, a sink/a room: a bed, a desk) when generating a map, and then can estimate the position of the moving robot 100 using various items of region feature information in an interior environment.

That is, according to the present disclosure, it is possible to perform position estimation that is strong against a change in light/illumination by storing features in the unit of an object, an object, and a region rather than using only specific points in an image when storing an environment.

Further, when a least a portion of the moving robot 100 goes under an object such as a bed or a sofa, the image acquisition unit 120 may not acquire an image sufficiently including feature points such a corner because the visual field is covered by the object. Alternatively, in an environment with a high ceiling, the accuracy in feature point extraction using a ceiling image may decrease.

However, according to the present disclosure, even though an object such as a bed or a sofa covers the image acquisition unit 120 or it is difficult to recognize a feature point because of a high ceiling, the controller 150 can determine the current position from region feature information such as a sofa and a living room other than feature points such as a corner.

Even in the same interior space, the performance of position estimation of the moving robot may be decreased due to a change in light/illumination at every point in time of cleaning. The present disclosure can improve the performance of cleaning traveling too by performing position estimation of the robot using main information in a region that is less influenced by light/illumination such as a desk, a dining table, and a sink.

Figure 9:
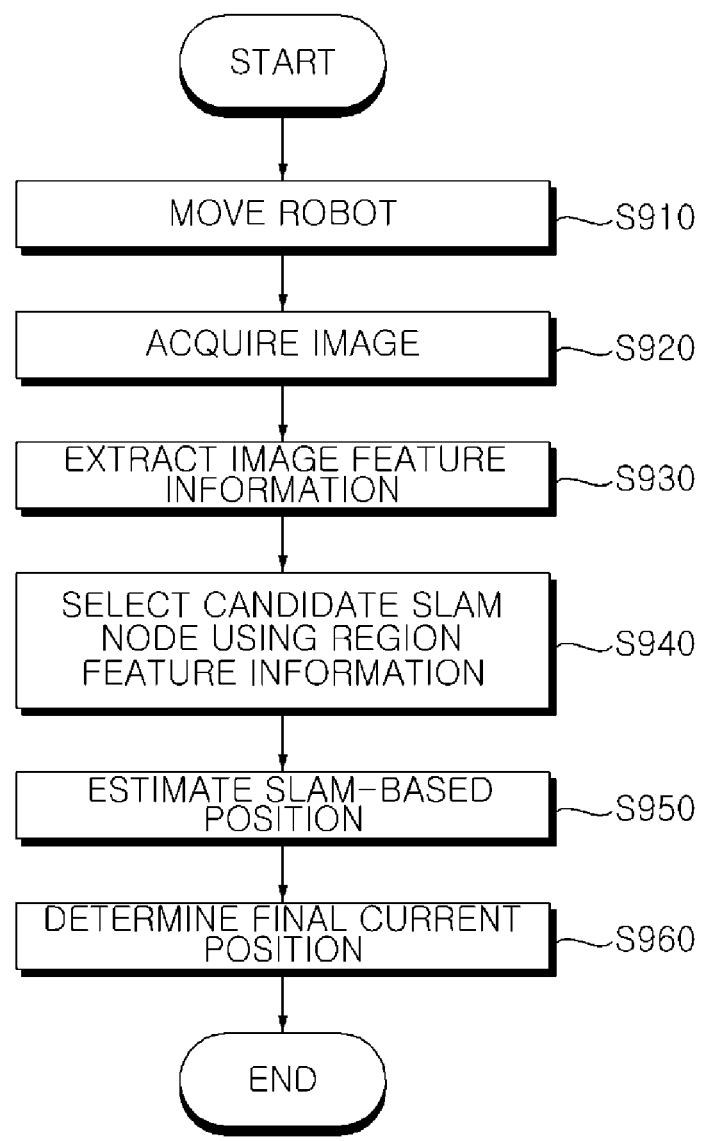
FIG. 9 is a flowchart showing a method of controlling a moving robot according to an embodiment of the present disclosure.

FIG. 9 is a flowchart showing a method of controlling a moving robot according to an embodiment of the present disclosure.

Referring to FIG. 9, the moving robot 100 can move in accordance with setting or instructions (S910). The moving robot 100 can acquire an image of surroundings of the moving robot 100 through the image acquisition unit 120 while moving or after moving a predetermined distance (S920).

The controller 150 can extract region feature information from the acquired image (S930).

The controller 150 can extract region feature information from an image taken to find out a current position. In this case, the region feature information may include a set of probability values of a region and an object recognized based on the acquired image, as described with reference to FIG. 6.

When initially generating a map, the controller 150 can store region feature information and position information (SLAM node information) that uses continuous image information and map information.

When finding out a current position after generating a map, the controller 150 can select candidate SLAM node information by comparing the region feature information of input image information and pre-stored region feature information (S940).

The controller 150 can compare extracted region feature information with region feature information stored when initially generating a map or the newest region feature information to which the recognition result until previous traveling is reflected.

The controller 150 can select SLAM node information as candidate SLAM node information in order to small difference between items of region feature information. The number of the candidate SLAM node information is set as N, it is possible to select N candidate SLAM node information in order of small difference between items of region feature information.

Alternatively, the controller 150 can select SLAM node information in which the difference between items of region feature information is a predetermined level or less as candidate SLAM node information. In this case, when there is one item of SLAM node information in which the difference between items of region feature information is a predetermined level or less, it is possible to determine the SLAM node information as the final current position. It is possible to select a plurality of items of SLAM node information as candidate SLAM node information. If there is a plurality of items of SLAM node information in which the difference between items of region feature information is a predetermined level or less, it is possible to select SLAM node information in which the difference between items of region feature information is the predetermined level or less as candidate SLAM node information.

On the other hand, the controller 150 can determine SLAM-based current position node information by performing SLAM-based position estimation (S950).

The controller 150 can select a node that is the most similar to feature information extracted from the acquired image of pre-stored node feature information as the SLAM-based current position node information. That is, the controller 150 can select current position node information by performing position recognition using feature information extracted from each node, as in the related art.

The controller 150 can generate a recognition descriptor based on a recognition image acquired through the image acquisition unit 120, and can select a node that is estimated as a current position of a plurality of nodes on a map by comparing pre-stored image information of the map and the recognition image information.

When all the similarities calculated for each comparison target nodes do not exceed a predetermined value in the node selection process, it is possible to determine that position recognition on the selected map failed. In the node selection process, when at least one of the similarities calculated for each comparison target nodes exceeds a predetermined value, it is possible to select the node where the largest value of the similarities is calculated. In the node selection process, it is possible to select a node that is estimated as a current position of a plurality of nodes on the map.

According to the present disclosure, in order to further improve accuracy in position recognition, the controller 150 can increase accuracy in position recognition by performing position recognition using all the feature information and the region feature information (S960).

For example, the controller 150 can select a plurality of candidate slam nodes by comparing the extracted region feature information with pre-stored region feature information (S940), and can determine the current position based on candidate slam node information that is the most similar to the SLAM-based current position node information of the plurality of selected candidate slam nodes (S960).

Thereafter, the robot 100 can recognize a node corresponding to the final current position determined in the process S960 and can keep traveling based on the node.

According to the present disclosure, it is possible to recognize the properties of a plurality region in a traveling section and to more accurately estimate the position of the moving robot based on the region property recognition result.

Further, since it is possible to perform meaning-based position estimation based on the result of recognizing regions such as a living room, a room, and a kitchen, it is possible to generate an available learning map even if there is a change in cleaning environment such as light, illumination, and weather.

Accordingly, it is possible to provide a position recognition technology that is strong against environmental changes, and provide a technology of efficiently and accurately recognizing a position in a traveling section by increasing the success rate in recognition of the current position of a moving robot and by estimating the current position with higher reliability.

Further, cleaning traveling that corresponds to a region property based on a region recognition result is possible. For example, it is possible to perform cleaning traveling in a quick cleaning mode in a warehouse and perform cleaning traveling in a minute cleaning mode in a specific room.

Figure 10:
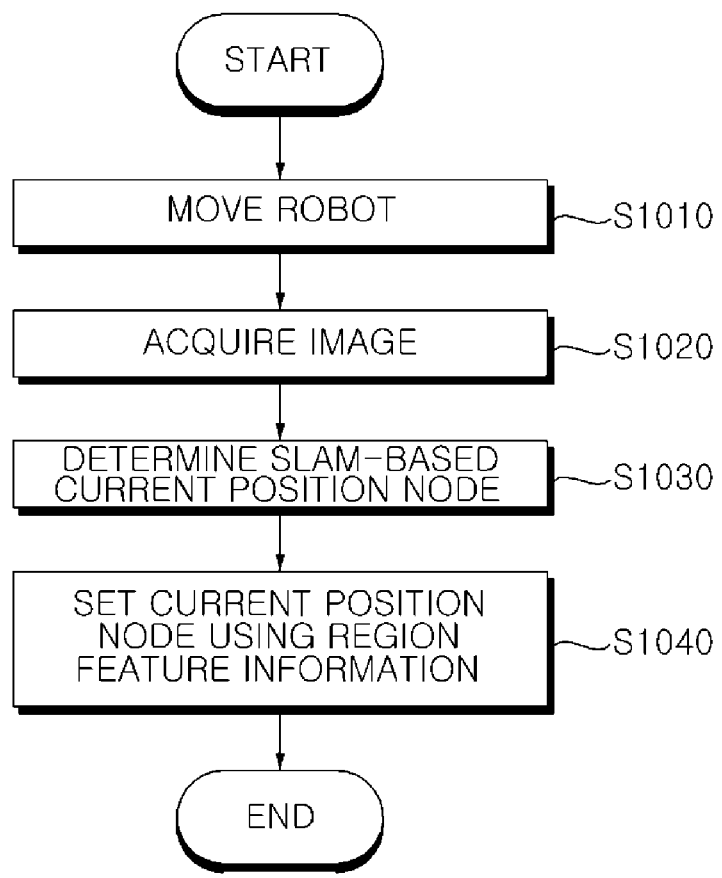
FIG. 10 is a flowchart showing a method of controlling a moving robot according to an embodiment of the present disclosure.

FIG. 10 is a flowchart showing a method of controlling a moving robot according to an embodiment of the present disclosure.

Referring to FIG. 10, the moving robot 100 can acquire an image through the image acquisition unit 120 (S1020) while moving or after moving a predetermined distance (S1010).

In this embodiment, first, it is possible to perform SLAM-based position estimation (S1030).

The controller 150 can select a node that is the most similar to feature information extracted from the acquired image of pre-stored node feature information as the SLAM-based current position node information. That is, the controller 150 can select current position node information by performing position recognition using feature information extracted from each node, as in the related art.

The controller 150 can generate a recognition descriptor based on a recognition image acquired through the image acquisition unit 120, and can select a node that is estimated as a current position of a plurality of nodes on a map by comparing pre-stored image information of the map and the recognition image information.

According to the present disclosure, it is possible to recognize the properties of a plurality region in a traveling section and to more accurately estimate the position of the moving robot based on the region property recognition result.

Further, in order to further improve accuracy in position recognition, the controller 150 can increase accuracy in position recognition by performing position recognition using all the feature information and the region feature information.

The controller 150 can extract region feature information from an image acquired through the image acquisition unit 120 and can determine the final current position by correcting the determined current position node information in accordance with the extracted region feature information (S1040).

In this case, the controller 150 can determine the node that is the most similar to the extracted region feature information of the pre-stored region feature information of nodes existing in a predetermined region as the final current position based on the SLAM-based current position node information.

Accordingly, even if there is a change in cleaning environment such as light, illumination, and weather at the same place, it is possible to accurately perform the current position and to travel based on a learning map that is strong against an available environmental change.

Figure 11:
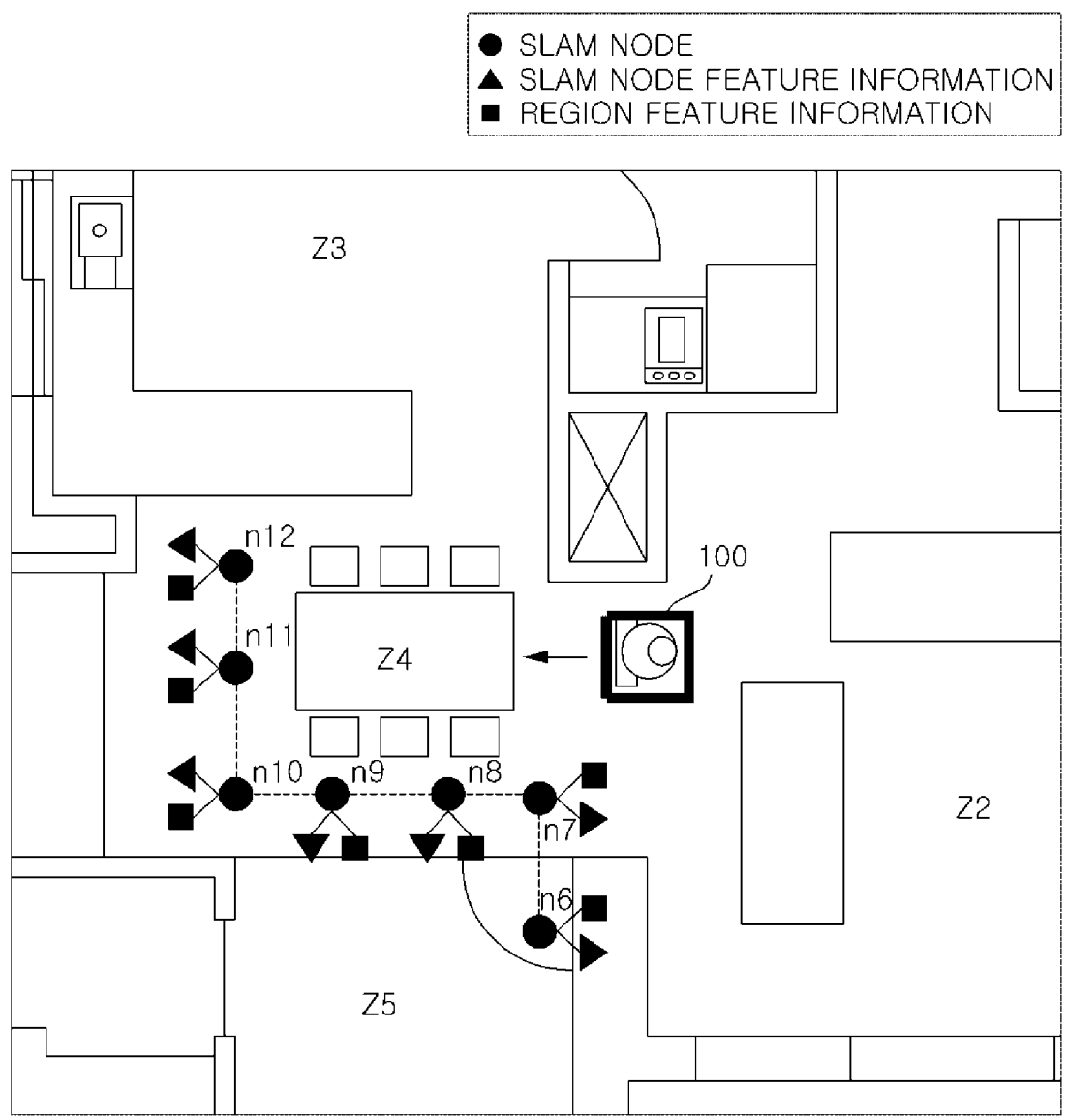
FIGS. 11 and 12 are views that are referred to for description about position recognition according to an embodiment of the present disclosure.
Figure 12:
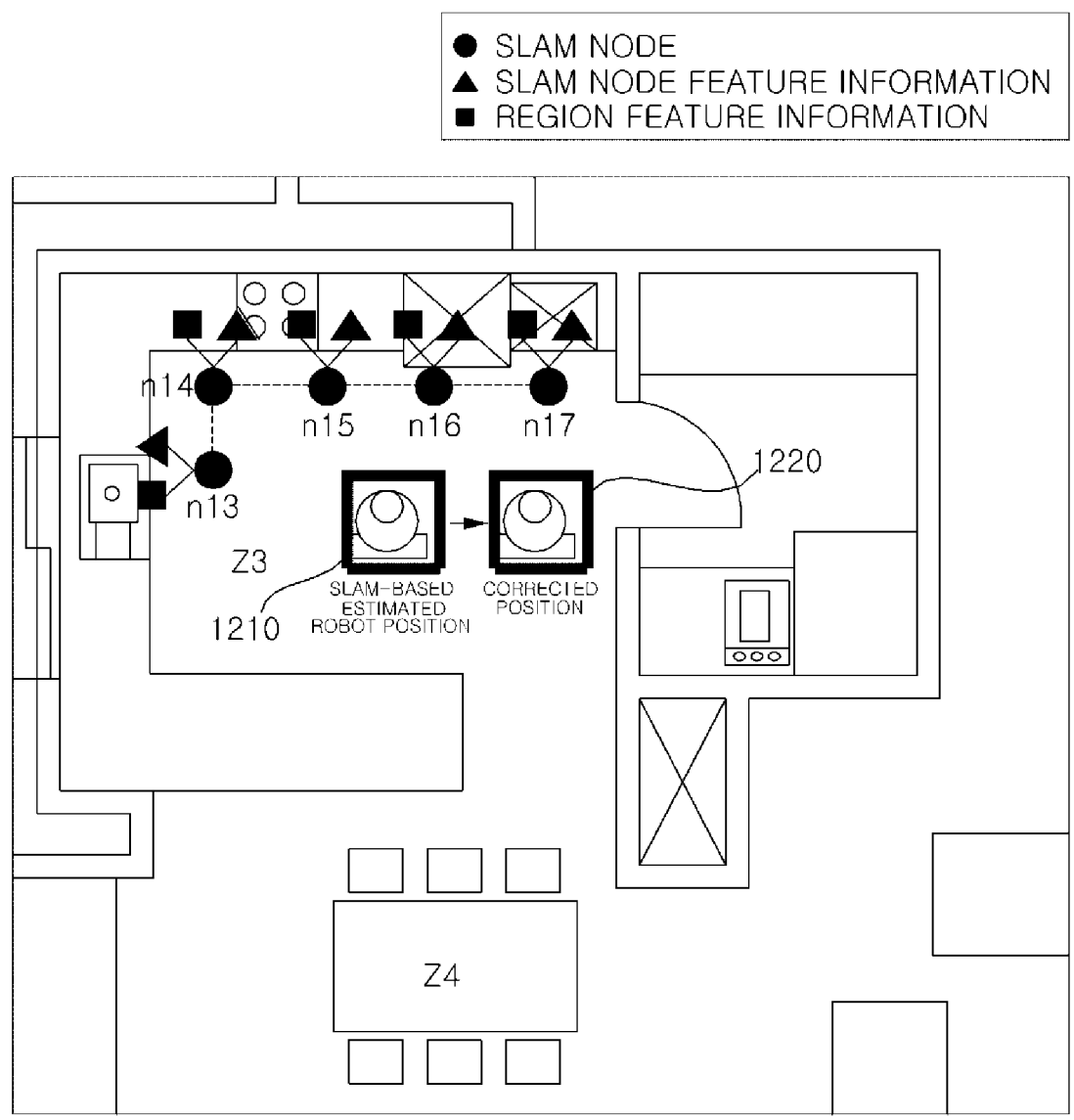

FIGS. 11 and 12 are views that are referred to for description about position recognition according to an embodiment of the present disclosure, in which FIG. 11 is a view that is referred to for description about the control method of FIG. 9 and FIG. 12 is a view that is referred to for description about the control method of FIG. 9.

FIGS. 11 and 12 are views exemplifying an example of recognizing a position in some regions on a generated map. Referring to FIGS. 11 and 12, a learning map generated by learning environmental changes may include a SLAM node, SLAM node feature information, region feature information, etc.

Referring to FIG. 11, the moving robot 100 may enter a fourth region Z4 from a fifth region Z5 or a second region Z2.

FIG. 11 briefly shows a sixth node n6 to a twelfth node n12 registered in the fourth region Z4.

The controller 150 can extract a candidate node of a current position based on a region feature information value. In this case, the candidate node may be a node having a small difference from a region feature information probability value extracted from an image acquired to estimate a position of the sixth node n6 to the twelfth node n12 registered in the fourth region Z4.

Depending on embodiments, the candidate node may be a node having the smallest difference from the probability value. Alternatively, the candidate node may be a node where the difference from a region feature information probability value is a predetermined value or less of the sixth node n6 to the twelfth node n12 registered in the fourth region Z4, or N candidate nodes may be selected in order of small difference from the probability value of the sixth node n6 to the twelfth node n12.

For example, the region feature information of the sixth node n6 may be [0.7 for a bed room, 0.8 for a door, . . . ], the region feature information of the seventh node n7 may be [0.8 for a dining room, 0.9 for a dining table, . . . ], the region feature information of the eighth node n8 may be [0.9 for a dining room, 0.7 for dining table, . . . ], the region feature information of the ninth node n9 may be [0.8 for a dining room, 0.9 for a chair, . . . ], the region feature information of the tenth node n10 may be [0.7 for a dining room, 0.9 for a wall, . . . ], and the region feature information of the eleventh node n11 may be [0.6 for a dining room, 0.8 for a dining table, . . . ].

If the region feature information extracted from an image to estimate s position in the fourth region Z4 is [0.7 for a dining room, 0.9 for a dining table, . . . ], the controller 150 can select the seventh node n7, the eighth node n8, and the eleventh node n11 as candidate nodes.

Depending on embodiments, the seventh node n7 having the smallest difference from a probability value may be immediately determined as the final current position.

Alternatively, the controller 150 can determine a SLAM-based current position node. The controller 150 can select current position node information by performing position recognition using feature information extracted from each node, as in the related art.

In this case, the controller 150 can determine a current position based on candidate SLAM node information (seventh node n7) that is the most similar to the SLAM-based current position node information of the plurality of selected candidate SLAM nodes (the seventh node n7, the eighth node n8, and the eleventh node n11).

Referring to FIG. 12, the moving robot 100 may travel through the third region Z3.

FIG. 12 briefly shows a thirteenth node n13 to a seventeenth node n17 registered in the third region Z3.

The controller 150 can determine a SLAM-based current position node. The controller 150 can select current position node information by performing position recognition using feature information extracted from each node, as in the related art.

The controller 150 can select the sixteenth node n16 as current position node information by comparing the feature information of the thirteenth node n13 to the seventeenth node n17 and feature information extracted from an image acquired to estimate a position in the third region Z3.

Further, the controller 150 can determine a first position 1210 corresponding to the sixteenth node n16 as a SLAM-based estimated position.

Thereafter, the controller 150 can determine the final current position by correcting that sixteenth node n16, which is the current position node determined as an estimated position of the robot based on SLAM, based on region feature information.

For example, the region feature information of the fifteenth node n15 may be [0.6 for a kitchen, 0.8 for an oven, . . . ], the region feature information of the sixteenth node n16 may be [0.8 for a kitchen, 0.9 for a sink, . . . ], and the region feature information of the seventeenth node n17 may be [0.7 for a kitchen, 0.9 for a refrigerator, . . . ].

The controller 150 can extract region feature information from an image acquired to estimate a position in the third region Z3.

For example, the controller 150 can extract feature information of [0.8 for a kitchen, 0.9 for a refrigerator,].

The controller 150 can correct the current position based on the extracted region feature information values [0.8 for a kitchen, 0.9 for a refrigerator, . . . ]. In this case, the controller 150 can determine the node (seventeenth node n17), which is the most similar to the region feature information of the pre-stored region feature information of nodes (fifteenth node n15 to seventeenth node n17) existing in a predetermined range from the SLAM-based current position node information (sixteenth node n16), as the finial current position.

The controller 150 can determine the final current position by performing correction from the first position 1210 corresponding to the sixteenth node n16 to the second position 1220 corresponding to the seventeenth node n17. Thereafter, the moving robot 100 may travel based on the second position 1220.

According to the present disclosure, it is possible to generate a learning map and estimate a position using region feature information that can cope with environmental changes such as a light change and an illumination change.

The configuration and method of the embodiments described above are not applied to the moving robot according to the present disclosure with limits, some or all of the embodiments may be selectively combined so that the embodiments can be changed in various ways.

Meanwhile, the method of controlling a moving robot according to an embodiment of the present invention may be implemented as a code that a processor can read in a recording medium that the processor can read. The recording medium that a processor can read includes all kinds of recording devices that keep data that can be read by a processor. The recording medium that a processor can read, for example, may be a ROM, a RAM, a CD-ROM, a magnetic tape, a floppy disk, and an optical data storage device, and includes a carrier wave such as transmission through the internet. Further, the recording medium that a processor can read may be distributed to computer systems that are connected through a network and may keep and execute codes that recording medium that a processor can read.

Further, although exemplary embodiments of the present disclosure were illustrated and described above, the present disclosure is not limited to the specific exemplary embodiments and may be modified in various ways by those skilled in the art without departing from the scope of the present disclosure described in claims, and the modified examples should not be construed independently from the spirit of the scope of the present disclosure.

According to at least one of embodiments of the present disclosure, it is possible to provide a position recognition technology that is strong against environmental changes.

Further, according to at least one of embodiments of the present disclosure, it is possible to provide a technology of efficiently and accurately recognizing a position in a traveling section by increasing the success rate in recognition of the current position of a moving robot and by estimating the current position with higher reliability.

Further, according to at least one of embodiments of the present disclosure, it is possible to recognize properties of a plurality of regions in a traveling section.

Further, according to at least one of embodiments of the present disclosure, it is possible to more accurately estimate the position of a moving robot based on a region property recognition result.

Meanwhile, other various effects will be directly or suggestively disclosed in detailed description according to embodiments of the present disclosure to be described below.

What is claimed is:

1. A method of controlling a moving robot, the method comprising;
    moving based on a map including a plurality of regions and a plurality of nodes;
    acquiring an image through an image acquisition unit;
    extracting feature point at each node based on the acquired image;
    extracting feature information from each extracted feature point;
    extracting region feature information including a set of probability values for a region and an object from the acquired image; and
    determining a current position based on Simultaneous localization and mapping (SLAM)-based current position node information, the extracted feature information and the extracted region feature information, and
    wherein the SLAM-based current position node information corresponds to a node that is the most similar to the feature information extracted from the acquired image of pre-stored node feature information, wherein the determining of a current position includes:

determining the SLAM-based current position node information; and determining a final current position by correcting the determined current position node information in accordance with the extracted region feature information.

2. The method of claim 1, wherein the determining of a current position includes:

selecting a plurality of candidate slam nodes by comparing the extracted region feature information with pre-stored region feature information; and determining a current position based on candidate slam node information that is the most similar to the SLAM-based current position node information of the plurality of selected candidate slam nodes.

3. The method of claim 1, wherein the determining of a final current position determines a node, which is the most similar to the extracted region feature information of pre-stored region feature information of nodes existing in a predetermined range from the SLAM-based current position node information, as the final current position.

* * * * *